United States Patent [19]
Higuchi et al.

[11] Patent Number: 5,987,262
[45] Date of Patent: Nov. 16, 1999

[54] OPTICAL APPARATUS

[75] Inventors: Tatsuji Higuchi, Akiruno; Takashi Inoue, Hachioji, both of Japan

[73] Assignee: Olympus Optical Co., Ltd., Tokyo, Japan

[21] Appl. No.: 09/149,654

[22] Filed: Sep. 8, 1998

[30] Foreign Application Priority Data

Sep. 9, 1997 [JP] Japan .................................. 9-244375

[51] Int. Cl.$^6$ ............................... G03B 3/00; G02B 7/04
[52] U.S. Cl. ............................................ 396/144; 359/823
[58] Field of Search ............................ 396/144, 85, 79; 359/824, 823, 696, 694

[56] References Cited

U.S. PATENT DOCUMENTS

| | | | |
|---|---|---|---|
| 5,515,129 | 5/1996 | Miyazawa et al. | 396/85 |
| 5,602,681 | 2/1997 | Nakayama et al. | 359/824 X |
| 5,715,481 | 2/1998 | Ohmiya | 396/79 |
| 5,748,394 | 5/1998 | Shimazaki et al. | 359/823 |

*Primary Examiner*—W. B. Perkey
*Attorney, Agent, or Firm*—Volpe and Koenig, P.C.

[57] ABSTRACT

An optical apparatus according to the present invention includes a moving lens frame guided movably in an optical axis direction by guide shafts, a drive source for driving the lens frame along the optical axis direction, a lead screw attached to the drive source, a nut member which is fitted on the lead screw and whose rotation is controlled by a rotation control section, the nut member moving only in the optical axis direction by rotation of the lead screw, and an urging spring for pressing part of the lens frame on the nut member such that the lens frame follows movement of the nut member. The lead screw has a top end portion and a bottom end portion each of which is a non-screw portion having a diameter smaller than that of a root of a screw portion of the lead screw, and a spring is fitted near the bottom end portion of the lead screw to urge the nut member, which is fitted in the bottom end portion, in such a manner that the nut member is pushed in a direction of the top end portion of the screw.

2 Claims, 3 Drawing Sheets

OPTICAL APPARATUS

BACKGROUND OF THE INVENTION

The present invention relates to an optical apparatus such as a camera, which is so constituted as to perform a predetermined optical adjustment by guiding a lens, which is supported by a lens frame, by means of guide shafts and moving it along an optical axis by a propulsive mechanism constituted of a lead screw and a driven member (e.g., a nut) fitted on the lead screw.

In an optical apparatus such as a camera, generally, a specific optical element such as a focusing lens supported by a lens frame, is guided by a guide member such as a guide shaft and moved in an optical axis direction. The optical element is then driven in the optical axis direction by a propulsive mechanism constituted of a lead screw and a driven member (e.g., a nut) fitted on the lead screw, thereby performing a predetermined optical adjustment such as a focus adjustment.

The propulsive mechanism moves the lens frame using the lead screw as a drive source, and the driven member thereof is constituted of a nut or a half nut in order to convert a turning force of the lead screw to a moving force thereof in the optical axis direction. In the propulsive mechanism having such a constitution, if a nut member is over-driven beyond a normal range for some reason, the following trouble will be caused.

If the nut member is over-driven in a direction of the top end of the lead screw, it is likely to fall from the lead screw. On the other hand, if the nut member is over-driven in a direction of the bottom end of the lead screw, it often bites a motor shaft.

To prevent the bite of the nut member, Jpn. Pat. Appln. KOKAI Publication No. 7-43591 discloses a means for cutting a power supply to a motor to stop a nut before the nut reaches a set physical stopping position, using an electrical position sensor.

However, even though the above position sensor is used, the bite of the nut member cannot be prevented completely but there remains a possibility that a bite will occur. It is therefore likely that a great trouble will be caused without any measures against the bite.

BRIEF SUMMARY OF THE INVENTION

It is accordingly an object of the present invention to provide an optical apparatus having a bite preventing means capable of reliably preventing a nut member from biting a lead screw and recovering the present condition immediately after the nut member falls from the lead screw.

To attain the above object, the optical apparatus of the present invention has the following features in constitution. The other features of the present invention will be clarified in the Description of the Embodiment.

An optical apparatus according to the present invention comprises a lens frame guided movably in an optical axis direction by guide shafts, a drive source for driving the lens frame along the optical axis direction, a lead screw attached to the drive source, a nut member which is fitted on the lead screw and whose rotation is controlled by a rotation control section, the nut member moving only in the optical axis direction by rotation of the lead screw, and an urging spring for pressing part of the lens frame on the nut member such that the lens frame follows movement of the nut member.

The lead screw has a top end portion and a bottom end portion each of which is a non-screw portion having a diameter smaller than that of a root of a screw portion of the lead screw, and a spring is fitted near the bottom end portion of the lead screw to urge the nut member, which is fitted in the bottom end portion, in such a manner that the nut member is pushed in a direction of the top end portion of the screw.

DETAILED DESCRIPTION OF THE INVENTION

Embodiment

Figure 1:
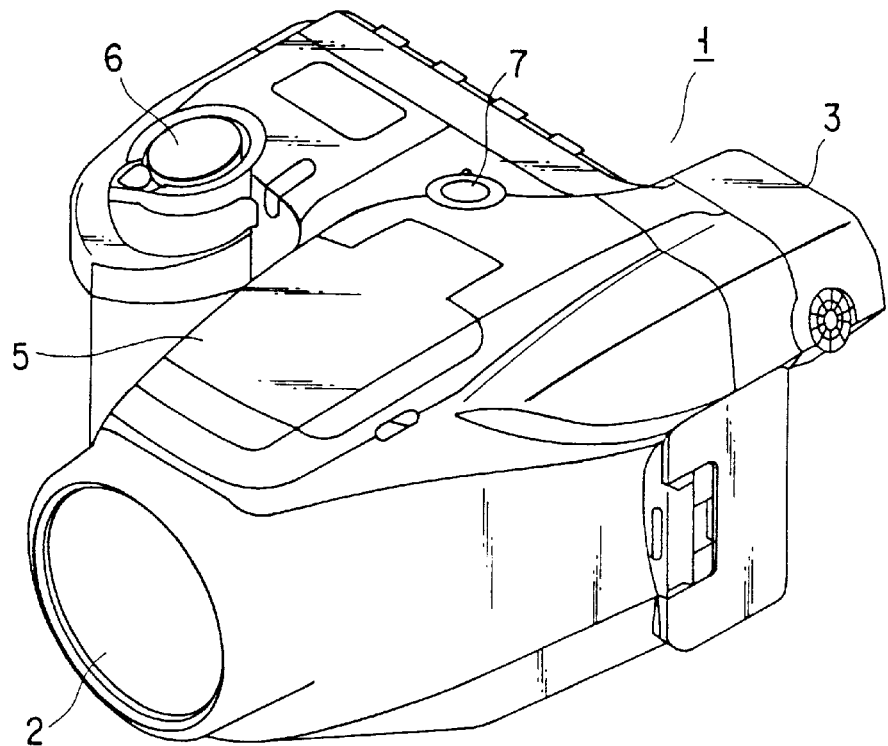
FIG. 1 is a front, perspective view of the outward appearance of an optical apparatus according to an embodiment of the present invention.
Figure 2:
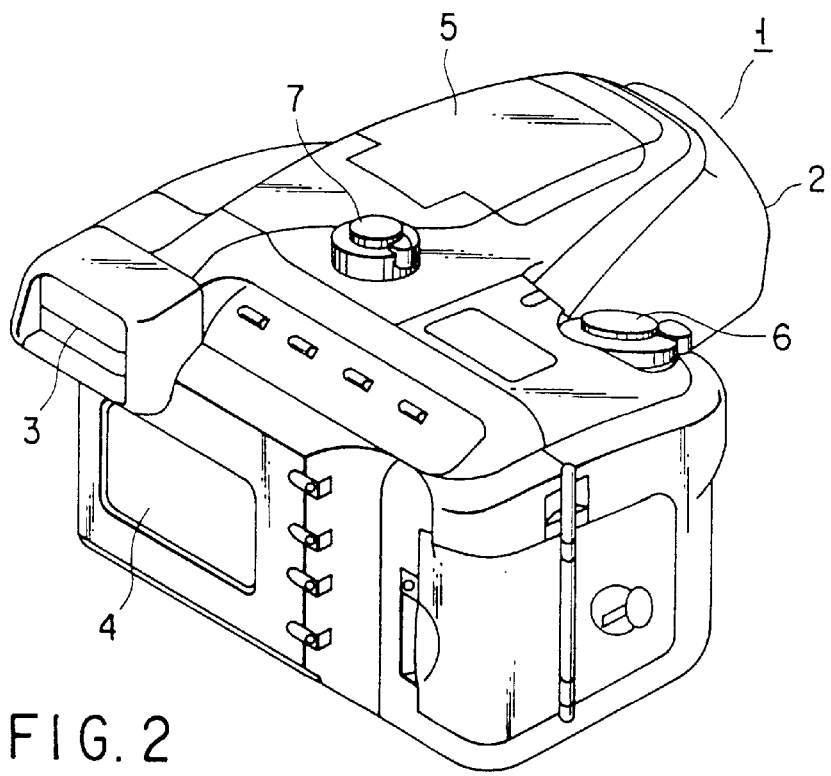
FIG. 2 is a back, perspective view of the outward appearance of the optical apparatus according to the embodiment of the present invention.

FIGS. 1 and 2 are views of the outward appearance of an optical apparatus according to an embodiment of the present invention, which is applied to an electronic camera. FIG. 1 is a front, perspective view of the optical apparatus and FIG. 2 is a back, perspective view thereof.

In FIGS. 1 and 2, reference numeral 1 indicates a camera body; 2, an optical system (including optical components such as a zoom lens); 3, a finder; 4, an LCD unit for monitoring; 5, a stroboscope; 6, a release button; and 7, a power switch. Hereinafter a lens barrel unit including the optical system 2, which is the main part of the present invention, will be described in detail.

Figure 3:
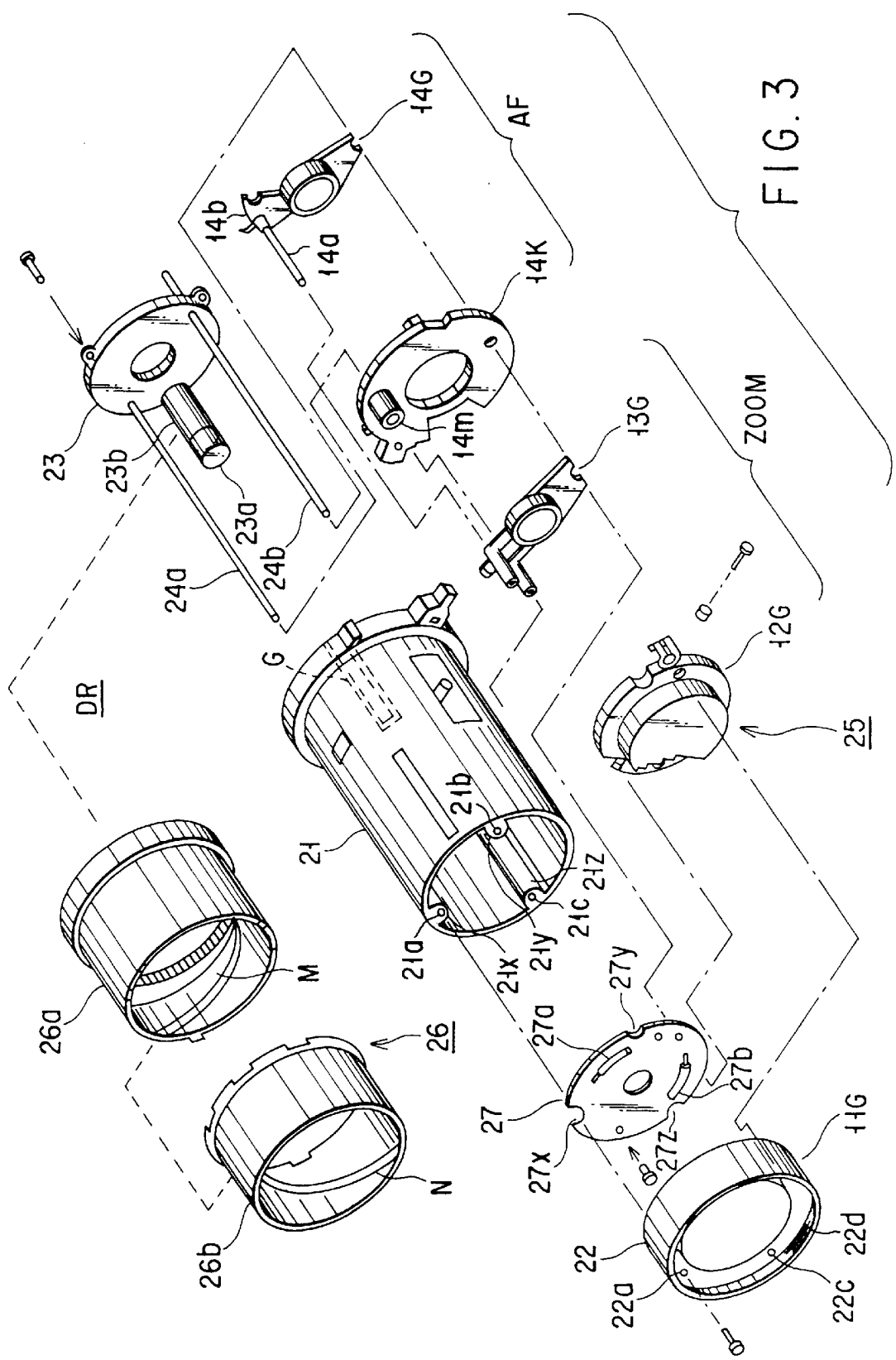
FIG. 3 is an exploded, perspective view of a lens barrel unit including an optical system built in a camera body of the optical apparatus according to the embodiment of the present invention.

FIG. 3 is an exploded, perspective view of a lens barrel unit including the optical system built in the camera body 1. The cylindrical case as illustrated in the center of FIG. 3 is a holding barrel 21 both ends of which are opened. A front lens barrel 22 is fixed to the front open end of the holding barrel 21, which is shown on the left side of FIG. 3, by a fixing means such as a screw, while a mounting substrate 23 is fixed to the rear open end of the holding barrel 21, which is shown on the right side of FIG. 3, by the fixing means.

One end of each of paired guide shafts 24a and 24b is inserted into a hole of the mounting substrate 23 and adhesively fixed thereto, and the other end thereof is fitted to and supported by the rim portion of the front lens barrel 22. These paired guide shafts 24a and 24b are arranged in the holding barrel 21 in parallel to the optical axis.

A moving lens frame group 25 (12G, 13G, 14G, etc.) is guided by the guide shafts 24a and 24b and moved slidably in the optical axis direction in the holding barrel 21.

As will be clearly described later, the moving lens frame 14G moves along the guide shafts 24a and 24b, together with the moving lens frames 12G and 13G, while it is mounted on a moving lens 14K. For convenience of description, in this embodiment, an optical component with a lens is denoted by G and that without a lens is represented by K. The components 12G and 13G are used chiefly for zooming (ZOOM) and the components 14G and 14K are for autofocus (AF), though they are not necessarily differentiated definitely. The components 14G and 14K are driven so as to be relatively brought close to and separated from each other by means of an AF motor 14m mounted on the moving frame 14K, thereby adjusting the focus automatically.

A plurality of ribs 21x, 21y and 21z (three ribs in this embodiment) are provided on the inner surface of the holding barrel 21 in parallel to the optical axis. These ribs extend from the front open end of the holding barrel 21 to the inner position thereof (which is beyond a light quantity adjusting unit 27 or an aperture shutter unit for adjusting a quantity of light passing therethrough). The ribs 21x, 21y and 21z therefore function as guide rails for the unit 27. The light quantity adjusting unit 27 is shaped like a disk and has notched portions 27x, 27y and 27z on its periphery. If the notched portions 27x, 27y and 27z are engaged with the ribs 21x, 21y and 21z, respectively to slide the light quantity adjusting unit 27 using the ribs as guides, the unit 27 can easily be inserted inwardly from the front open end of the holding barrel 21.

The ribs 21x, 21y and 21z are provided at one end with screw holes 21a, 21b and 21c for screwing the front lens barrel 22.

The front lens barrel 22 has mounting threads 22d formed on the inner surface thereof to detachably mount optical components such as an adapter lens and a filter from outside. The front lens barrel 22 also has screw inserting holes 22a to 22c corresponding to the screw holes 21a to 21c of the ribs 21x to 21z.

A cam cylinder 26 for moving the moving lens frame group 25 back and forth in the optical axis direction, is fitted on the outer surface of the holding barrel 21 such that it can slidably contact and rotate thereon. The cam cylinder 26 includes a first cam cylinder 26a having a convex cam M on its inner surface and a second cam cylinder 26b having a concave cam N thereon. These first and second cam cylinders 26a and 26b are coupled to each other and rotated together by a driving source which is constituted of a zoom motor 23a and a reduction mechanism 23b fixed on the mounting substrate 23.

The relationship in mutual coupling between the moving lens frames 13G and 14G, which requires a very high precision optical position, will now be described. For convenience of description, the moving lens frames 13G and 14G are called first and second lens frames 13G and 14G, respectively.

The first lens frame 13G can slide along the guide shafts 24a and 24b, and includes two fitting portions fitted to the guide shafts 24a and 24b and a bearing parallel to the optical axis. The bearing has a sleeve into which a pin of the second lens frame is inserted and a bearing holding section which is formed so as to hold the sleeve. The sleeve is adhesively fixed in the bearing holding section.

The second lens frame 14G is provided at one end with a holding section 14b for holding a distal end portion of a pin 14a which is inserted into the sleeve of the first lens frame 13G and, at the other end, with a fitting portion which is to be fitted to one 24b of the guide shafts. Thus, the first and second lens frames 13G and 14G are arranged so as to be relatively brought into contact with and separated from each other.

Figure 4:
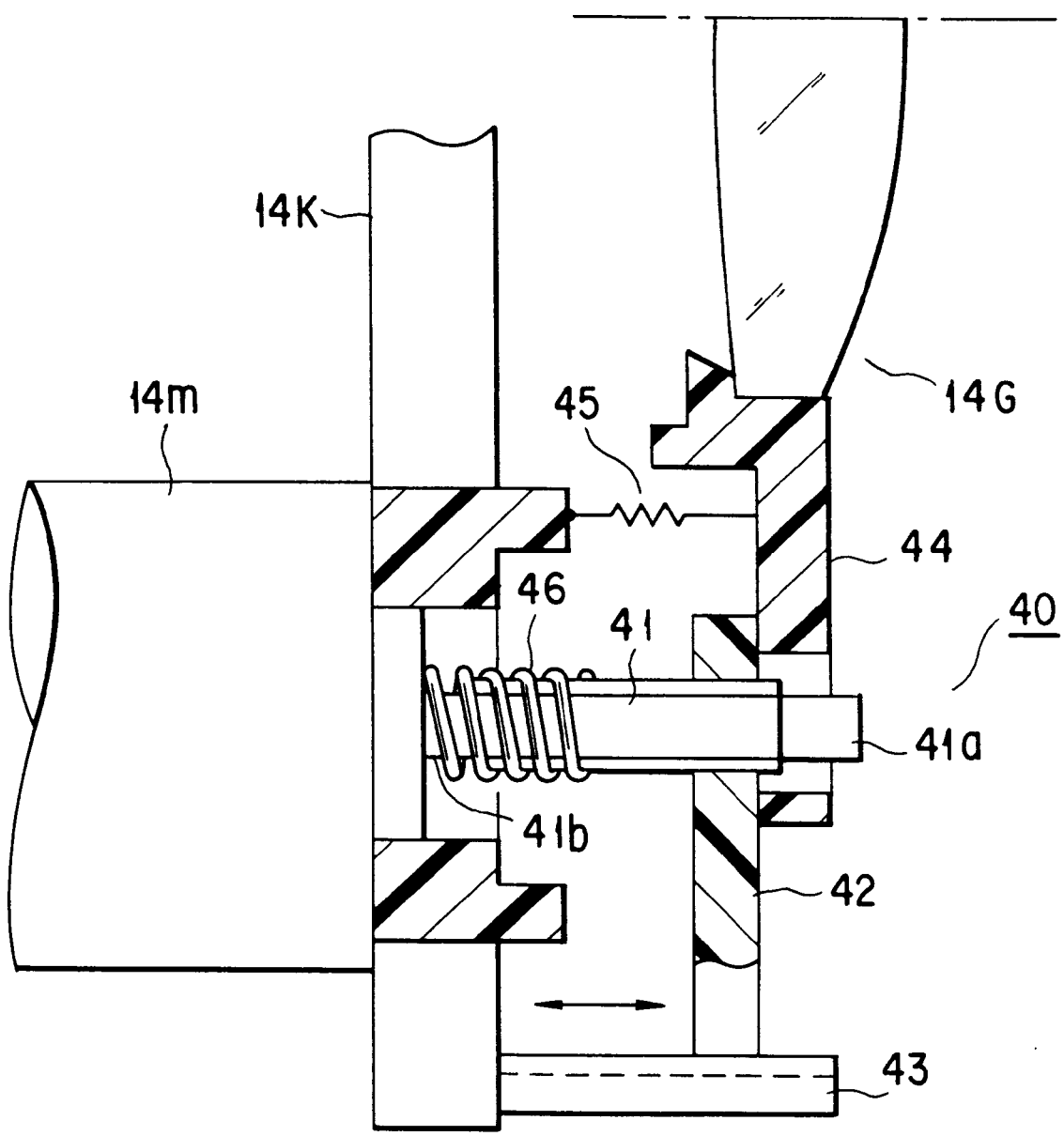
FIG. 4 is a partly broken side view of a coupling portion of an AF motor and a moving lens frame of the optical apparatus according to the embodiment of the present invention.

FIG. 4 shows a relationship in coupling between the AF motor 14m and moving barrel frame 14G. In FIG. 4, reference numeral 40 represents a coupling mechanism, and it is constituted as follows.

The moving lens frame 14G is guided movably in the optical axis direction by the guide shafts 24a and 24b. In order to drive the frame 14G along the optical axis, a lead screw 41 is attached to the AF motor 14m serving as a driving source on the moving frame 14K.

A nut member 42 is fitted on the lead screw 41 and its rotation is controlled by a rotation control section 43 formed on part of the moving frame 14K. Thus, the nut member 42 moves only in the optical axis direction by rotation of the lead screw 41. Part 44 of the moving lens frame 14G is pressed on the nut member 42 by an urging spring (extension spring) 45 such that the moving lens frame 14G follows the movement of the nut member 42.

The lead screw 41 has a top end portion 41a and a bottom end portion 41b each of which is a non-screw portion having a diameter smaller than that of a root of a screw portion 41c. Even though the nut member 42 is fitted to the bottom end portion 41b of the lead screw 41, a coil spring 46 is fitted on the bottom end portion of the screw 41 to urge the nut member 42 such that it is pushed in a direction of the top end portion of the screw 41.

Modifications

The optical apparatus according to the above embodiment can be modified as follows:

i) In place of the coil spring 46, a plate-like spring member, which is shaped like an umbrella-type washer, is used as a returning spring.

Features of the Embodiment

[1] An optical apparatus according to the embodiment of the present invention comprises a moving lens frame 14G guided movably in an optical axis direction by guide shafts 24a and 24b, a drive source 14m for driving the lens frame 14G along the optical axis direction, a lead screw 41 attached to the drive source, a nut member 42 which is fitted on the lead screw 41 and whose rotation is controlled by a rotation control section 43, thereby moving only in the optical axis direction by rotation of the lead screw 41, and an urging spring 45 for pressing part of the lens frame 14G on the nut member 42 such that the lens frame 14G follows movement of the nut member 42.

The lead screw 41 has a top end portion 41a and a bottom end portion 41b each of which is a non-screw portion having a diameter smaller than that of a root of a screw portion of the lead screw 41, and a spring 46 is fitted near the bottom end portion 41b of the lead screw 41 to urge the nut member 42, which is fitted in the bottom end portion 41b, in such a manner that it is pushed in a direction of the top end portion of the screw 41.

In the foregoing optical apparatus, even when the nut member 42 of the propulsive element deviates from a predetermined drive range of the lead screw for some reason, its moving amount is restricted and it is prevented from biting the lead screw 41 since no screws are formed outside the normal drive range of the lead screw 41. Moreover, even though the nut member 42 is fitted in the bottom end portion 41b of the lead screw, the nut member 42 is pushed back within the normal drive range by the urging force of the spring 46. It is therefore unnecessary to perform any special recovery operation.

[2] In the optical apparatus as described in above item [1], the spring 46 is a coil spring which is compressed at the non-screw portion of the bottom end portion 41b of the lead screw 41 when the spring 46 is pressed by the nut member 42.

In the above optical apparatus, the spring 46 is easy to mount and does not inhibit a bite preventing function of the non-screw portion.

We claim:

1. An optical apparatus comprising:

a moving lens frame guided movably in an optical axis direction by guide shafts;

a drive source for driving the lens frame along the optical axis direction;

a lead screw attached to the drive source;

a nut member which is fitted on the lead screw and whose rotation is controlled by a rotation control section, the nut member moving only in the optical axis direction by rotation of the lead screw; and an urging spring for pressing part of the lens frame on the nut member such that the lens frame follows movement of the nut member, wherein the lead screw has a top end portion and a bottom end portion each of which is a non-screw portion having a diameter smaller than that of a root of a screw portion of the lead screw, and a spring is fitted near the bottom end portion of the lead screw to urge the nut member, which is fitted in the bottom end portion, in such a manner that the nut member is pushed in a direction of the top end portion of the screw.

2. The optical apparatus according to claim 1, wherein the spring is a coil spring which is compressed at the non-screw portion of the bottom end portion of the lead screw when the spring is pressed by the nut member.

* * * * *